United States Patent [19]
Bond

[11] 4,120,082
[45] Oct. 17, 1978

[54] UNIVERSAL DRIVE SHAFT SERVICE KIT

[76] Inventor: William L. Bond, 510 Greenwood Rd., Linthicum Heights, Md. 21090

[21] Appl. No.: 834,662

[22] Filed: Sep. 19, 1977

[51] Int. Cl.$^2$ .............................................. B23P 19/04
[52] U.S. Cl. ......................................... 29/254; 29/256
[58] Field of Search ................ 29/254, 255, 256, 266, 29/244, 282

[56] References Cited

U.S. PATENT DOCUMENTS

| | | | |
|---|---|---|---|
| 1,865,420 | 6/1932 | Kick | 29/256 |
| 2,230,918 | 2/1941 | Walter | 29/256 |
| 2,485,022 | 10/1949 | Taylor | 29/256 |
| 3,230,617 | 1/1966 | Spiess et al. | 29/256 |
| 3,786,544 | 1/1974 | Ferguson | 29/256 |

FOREIGN PATENT DOCUMENTS

| | | | |
|---|---|---|---|
| 1,382,264 | 11/1964 | France | 29/254 |

Primary Examiner—James L. Jones, Jr.
Attorney, Agent, or Firm—Cushman, Darby & Cushman

[57] ABSTRACT

A kit for servicing a constant velocity drive shaft, particularly of the type found on General Motors automobiles. A first tool safely removes bearings held by a nylon ring from the yoke without damaging the yoke and includes a stud support member with yoke supports extending upwardly therefrom to engage the yoke, a pair of rods extending upwardly outside the yoke supports and through a top member to threadingly engage nuts for applying force to the yoke. A bushing receiver is mounted on the top member to receive the bearing as it is forced from the yoke. A second tool has a free swinging center for gripping the bearing after it has been pushed out a distance by the first tool. A third tool holds the cross and yoke in alignment during reassembly.

6 Claims, 6 Drawing Figures

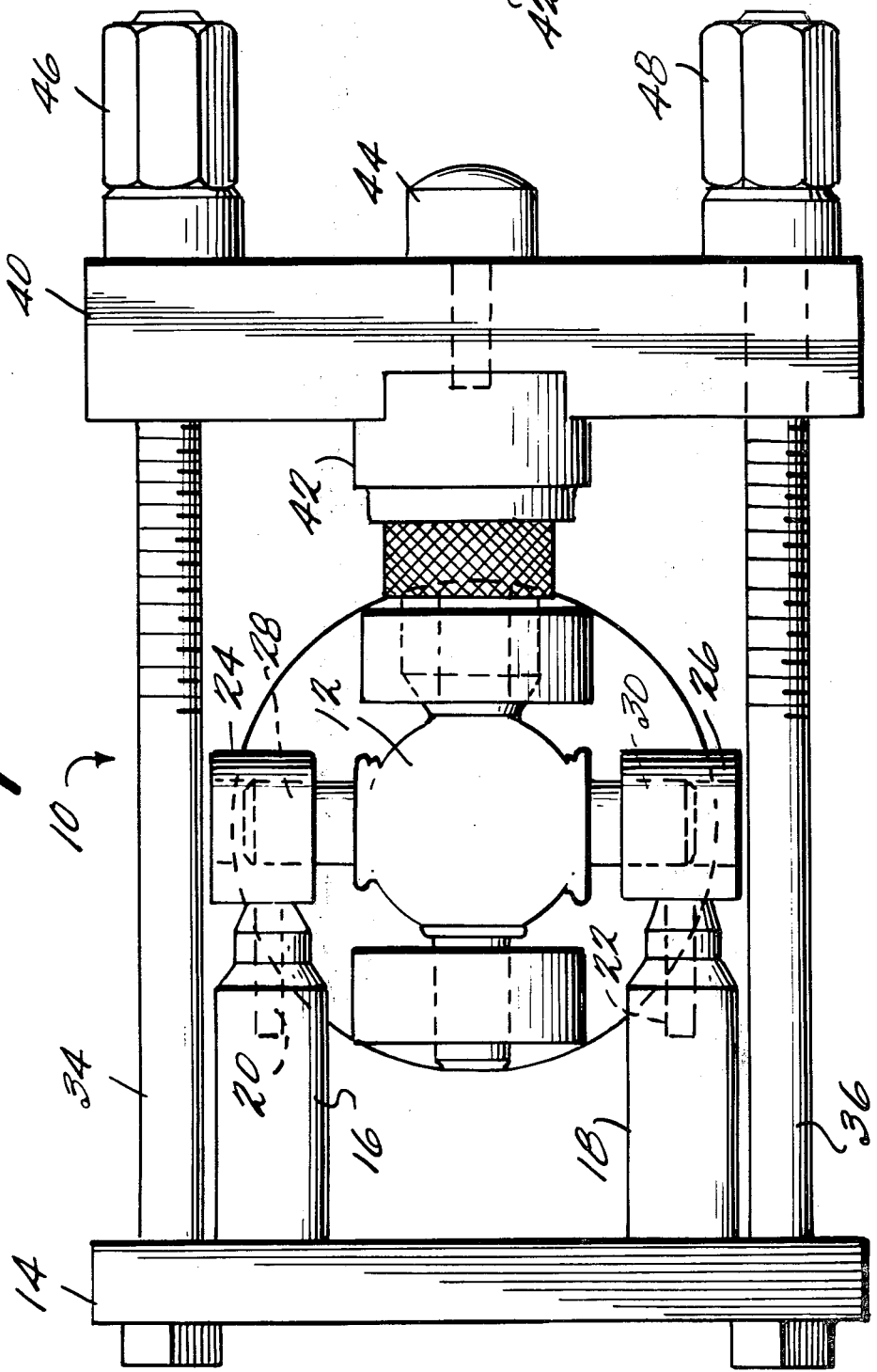

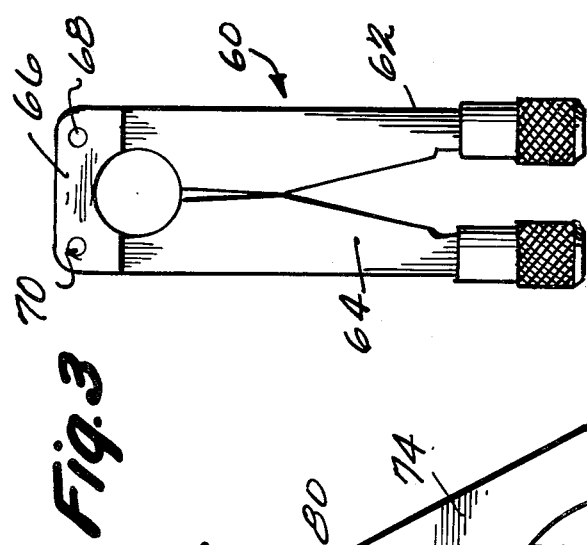
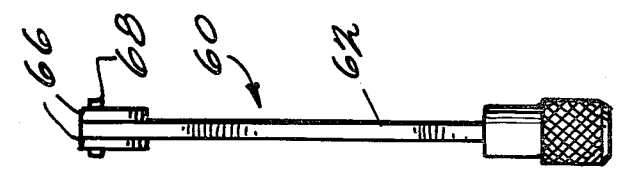
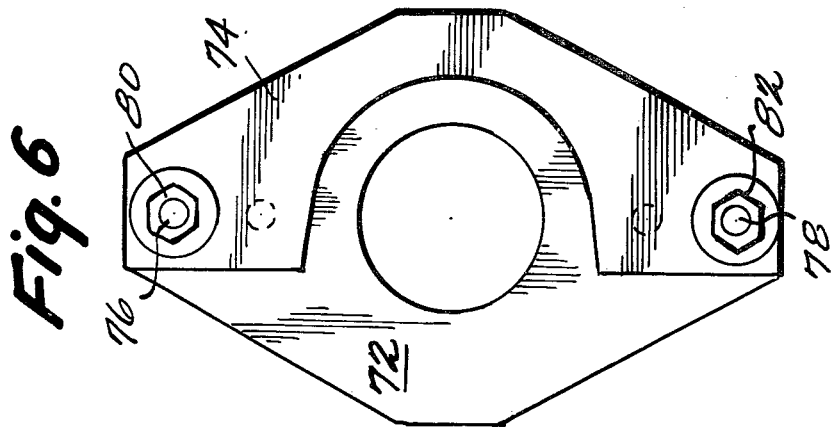
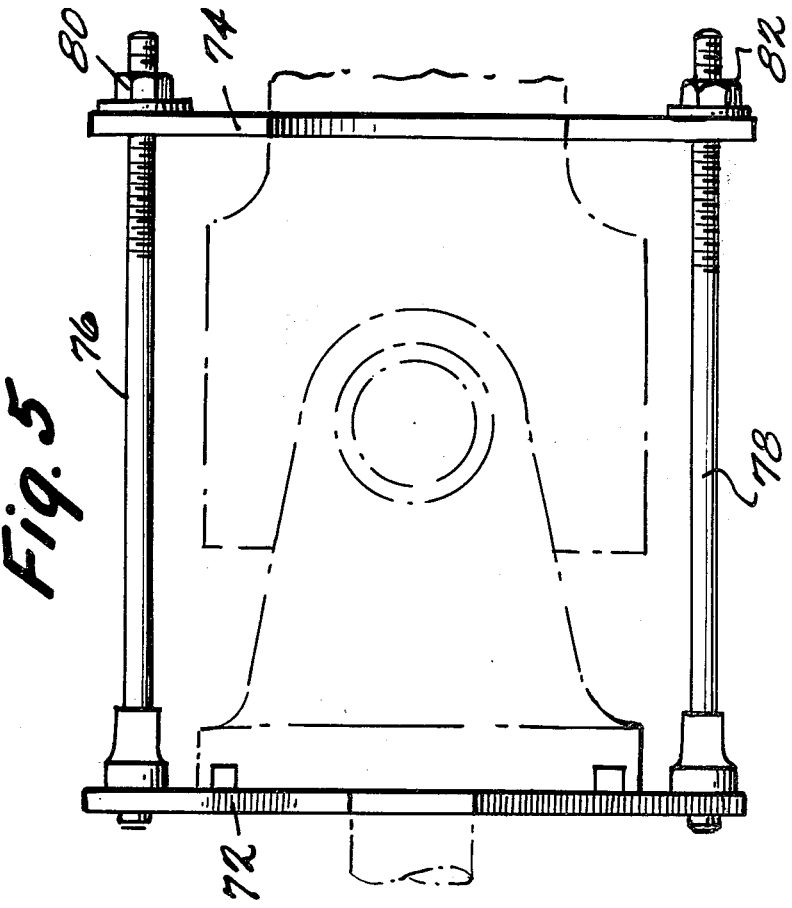

UNIVERSAL DRIVE SHAFT SERVICE KIT

BRIEF DESCRIPTION OF THE PRIOR ART AND BACKGROUND OF THE INVENTION

The invention relates to a kit for servicing a constant velocity universal drive shaft and more particularly for removing the bearings therefrom without damaging the yoke and for properly aligning the yoke for reassembly of the drive shaft.

Many automobiles require service of the universal drive shaft during the lifetime of the vehicle. For constant velocity drive shafts the bearings which mount the cross in the yoke are removed and then the unit is disassembled. After servicing, the unit is then reassembled by replacing the factory installed bearings with replacement bearings which differ somewhat from the factory installed bearings. The factory installed bearing has a groove which bears a nylon ring holding the bearing in position. To remove the cross, the nylon ring must be sheared and this is accomplished by applying a substantial force, typically several tons, to the yoke.

The force is typically applied by means of a hydraulic unit which applies its force to the yoke via a fork. However, with such a fork, it is not possible to ensure that the large force applied to the yoke will be applied in proper alignment to coincide with centers of the cross. If the fork is not properly aligned, the forces may, by application of a differential force, distort the area of the yoke around the bearing with the result that the balance of the universal drive shaft will be adversely affected and the drive shaft will have to be discarded. In addition, the operation can be dangerous since the fork, if not properly aligned, may slip causing injury to the workers or damage to adjacent equipment.

Another difficulty in servicing universal drive shafts is in properly aligning the yoke and the cross when the unit is reassembled. This operation is now normally done manually by mounting the drive shaft in a vise or the like and manually manipulating the yoke until the parts can be reassembled.

The present invention relates to a unique assembly which resolves the problems which have resulted from prior art devices as described above. More particularly, the present kit includes a bearing ring shearing tool in which the yoke is held in a properly aligned fashion while the shearing force is applied. As described in greater detail below, a pair of yoke supports extend upwardly from a stud support member to engage the yoke. Outside the stud support members, a pair of rods extend also upwardly from the stud support member and through bores in a top member. Thrust nuts or the like engage threads on the tops of the rods to apply a force to the top member which is communicated through a bearing receiving structure mounted on that top member and which extends about the bushing to be received. The resultant force causes the nylon locking ring to shear and the bearing to move into the receiving structure.

After the bearing has been pushed out of the yoke, for example, about ⅜ inch, a bearing remover which grips the bearing about roughly 360° provides a convenient way to finish the removal of the bearing. This tool is pivotably mounted with a free swinging center to grip the bearing.

The kit further includes a second device or tool for aligning the yoke and the cross during reassembly. This tool includes a pair of plates, a flange backup plate and a neck support plate which are connected together by a pair of separated rods which extend through bores in the neck support plate. The extending portions of the rods are threaded and nuts engage the threads to permit application of a force between the plates, which can be used to hold the cross and the yoke in proper alignment while the final two bearings are being installed.

Many other objects and purposes of the invention will be clear from the following detailed description of the drawings.

BRIEF DESCRIPTION OF THE DRAWINGS

FIGS. 1 and 2 show a side and front view, respectively, of the bearing removal tool;

FIGS. 3 and 4 show a front and side view, respectively, of the tool for gripping the bearing; and FIGS. 5 and 6 show a front and side view, respectively, of the tool for holding the cross and yoke in alignment during reassembly.

DETAILED DESCRIPTION OF THE DRAWINGS

Reference is now made to FIGS. 1 and 2 which respectively illustrate a front and side view of one tool of the kit of the present invention. The bearing ring shearing tool 10 illustrated in FIGS. 1 and 2 mounts on the yoke 12 of a universal drive shaft particularly of the kind which is found on cars manufactured by the General Motors Corporation. Tool 10 functions to shear a nylon ring which is disposed in a groove of each of a number of bearings of the universal drive shaft which must be removed in order to disassemble the unit for service and repair.

Tool 10 includes a stud support bar 14 which mounts at separated locations yoke support members 16 and 18. Yoke support members 16 and 18 further are provided with bores 20 and 22 extending therein from the end remote from member 14 for receiving pins of cross mounts 24 and 26. Cross mounts 24 and 26 are each provided in addition with bores 28 and 30 which receive opposite arms of the cross and thus mount the yoke in a fixed position.

Tool 10 further includes rods 34 and 36 which are mounted on the stud support member 14 outside of yoke supports 16 and 18. Rods 34 and 36 are threaded on the end opposite from member 14 and extend through bores in a top support member 40 which mounts in a central inset portion a member 42 for receiving a bearing as it is forced by the application of pressure from the yoke. An impact knob 44 is mounted on member 40 on the side opposite from member 42 for communicating a shock, e.g., resulting from the impact of a hammer, to member 42 to aid in shearing the nylon ring. Member 42 is provided with a bore for receiving the bearing.

Threaded nuts 46 and 48 are arranged on rods 34 and 36, respectively, for applying force to top member 40. Nuts 46 and 48 may be provided with appropriate ball bearings if desired.

The first step in servicing a universal drive shaft is to remove the bearings from the yoke using the tool illustrated in FIGS. 1 and 2 as described generally above. Further, after the tool of FIGS. 1 and 2 has been used, the bearing will extend roughly ⅜ inch above the yoke. The bearing can be difficult to remove with conventional pliers, since portions may be slippery and difficult to hold. The tool 60 illustrated in FIGS. 3 and 4 has been found to be particularly effective for removing bearings after use by the tool of FIGS. 1 and 2. Tool 60 includes respective members 62, 64 and 66 which are pivotably connected together at points 68 and 70 to provide a free swinging center to grip the bearing.

FIGS. 5 and 6 illustrate a further tool which is useful for holding the cross and yoke in alignment during reassembly of the unit. Tool 70 includes a flange back plate 72, a neck support plate 74 and rods 76 and 78 extending therebetween. Nuts 80 and 82 are used to apply the force between the plates which causes the alignment and holds the yoke and cross so that the bearings can be inserted.

Many changes and modifications in the above-described embodiment of the invention can, of course, be carried out without departing from the scope thereof. Accordingly, that scope is intended to be limited only by the scope of the appended claims.

What is claimed is:

1. A tool for removing bearings having a nylon locking ring from the yoke of a constant velocity universal drive shaft without damaging the yoke comprising:
    a stud support member;
    a pair of yoke supports extending upwardly from said stud support member at separated locations to engage said yoke;
    a pair of rods extending upwardly from said stud support member outside said yoke supports, and threaded on the end opposite said stud support member;
    a top member having bores through which said rods extend;
    means mounted on said top member for engaging said yoke about a bearing, and for receiving said bearing; and
    thrust means engaging said threads on each said rod for applying a force to said top member to cause said nylon locking ring to shear and said bearing to move into said engaging and receiving means.

2. A tool as in claim 1, further including an impact knob mounted on said top member on the side opposite said engaging and receiving means for communicating a shock to said bearing to aid in shearing said ring.

3. A tool as in claim 1, wherein said yoke supports include means for engaging a cross within said yoke.

4. A tool as in claim 1, wherein said members extend in parallel.

5. A kit for servicing a constant velocity universal drive shaft comprising:
    a first tool and a second tool, said first tool including:
    a flange backup plate for engaging the front or rear yoke;
    a neck support plate for engaging the neck of the drive shaft;
    a pair of rods extending between said plates and extending through bores in one of said plates, the extending portion being threaded; and
    means for engaging each of the threaded portions for applying a force between said plates to cause said alignment; and
    said second tool including:
    a stud support member;
    a pair of yoke supports extending upwardly from said stud support member at separated locations to engage said yoke;
    a pair of rods extending upwardly from said stud support member outside said yoke supports, and threaded on the end opposite said stud support member;
    a top member having bores through which said rods extend;
    means mounted on said top member for engaging said yoke about a bearing, and for receiving said bearing; and
    thrust means engaging said threads on each said rod for applying a force to said top member to cause said nylon locking ring to shear and said bearing to move into said engaging and receiving means.

6. A kit as in claim 5, further including means having a free swinging center for gripping a bearing.

* * * * *